United States Patent
Yamaguchi et al.

[11] Patent Number: 5,881,466
[45] Date of Patent: *Mar. 16, 1999

[54] FEEDING APPPARATUS CAPABLE OF RESTRAINING A YAWING MOTION

[75] Inventors: Toshiaki Yamaguchi; Nobumitsu Takahashi; Hiroki Yamaguchi, all of Gunma, Japan

[73] Assignee: NSK Ltd., Tokyo, Japan

[*] Notice: The term of this patent shall not extend beyond the expiration date of Pat. No. 5,701,677.

[21] Appl. No.: 989,446

[22] Filed: Dec. 12, 1997

Related U.S. Application Data

[63] Continuation of Ser. No. 653,326, May 24, 1996, Pat. No. 5,701,677.

[30] Foreign Application Priority Data

May 25, 1995 [JP] Japan ................................. 7-126599

[51] Int. Cl.$^6$ ................................................ G01B 3/00
[52] U.S. Cl. ................... 33/1 M; 74/89.15; 74/490.09; 108/137
[58] Field of Search .................... 33/1 M, 18.1; 74/89.15, 89.2, 490.09, 471; 108/20, 137, 143; 312/110, 331; 414/749; 901/21, 48

[56] References Cited

U.S. PATENT DOCUMENTS

| | | | |
|---|---|---|---|
| 3,422,538 | 1/1969 | Panissidi | 33/1 M |
| 3,529,481 | 9/1970 | Budzyn | 33/1 M |
| 4,007,544 | 2/1977 | Kirby et al. | 33/1 M |
| 4,420,886 | 12/1983 | Amano | 33/1 M |
| 4,856,197 | 8/1989 | Auer et al. | 33/1 M |
| 5,063,676 | 11/1991 | Gerber | 33/1 M |
| 5,311,790 | 5/1994 | Yanagisawa | 74/89.15 |
| 5,311,791 | 5/1994 | Yanagisawa | 74/89.15 |
| 5,333,386 | 8/1994 | Breyer et al. | 33/1 M |
| 5,395,165 | 3/1995 | Woerner | 312/110 |
| 5,701,677 | 12/1997 | Yamaguchi et al. | 33/1 M |

FOREIGN PATENT DOCUMENTS

| | | |
|---|---|---|
| 4123410 | 1/1993 | Germany . |
| 4226072 | 2/1993 | Germany . |

*Primary Examiner*—G. Bradley Bennett
*Attorney, Agent, or Firm*—Sughrue, Mion, Zinn, Macpeak & Seas, PLLC

[57] ABSTRACT

A feeding apparatus provides a base; a movable body elongated in a longitudinal direction orthogonal to a moving direction of the movable body on the base; a pair of linear guide devices arranged on the base in parallel with each other, for guiding the movable body in the moving direction; a linear drive device mounted on the base for moving the movable body along the linear guide device; and an attitude stabilizing device mounted on the base for restraining a yawing motion of the movable body, the attitude stabilizing device including at least one transmission member, first and second fastening points formed in the movable body for fixing the transmission member, the first and second fastening points being separated from each other in the longitudinal direction, and first and second direction-changing devices mounted on the base and separated from each other in the moving direction. Each of the first and second direction-changing devices turns the transmission member around to be fastened at the first and second fastening points, respectively.

18 Claims, 11 Drawing Sheets

FEEDING APPPARATUS CAPABLE OF RESTRAINING A YAWING MOTION

This is a continuation of application Ser. No. 08/653,326 filed May 24, 1996; U.S. Pat. No. 5,701,677.

BACKGROUND OF THE INVENTION

The present invention relates to a feeding apparatus, and more particularly to a feeding apparatus which is able to restrain a yawing motion of a movable body, which is elongated in the direction at a right angle to the moving direction thereof, with a simple mechanism.

Figure 15:
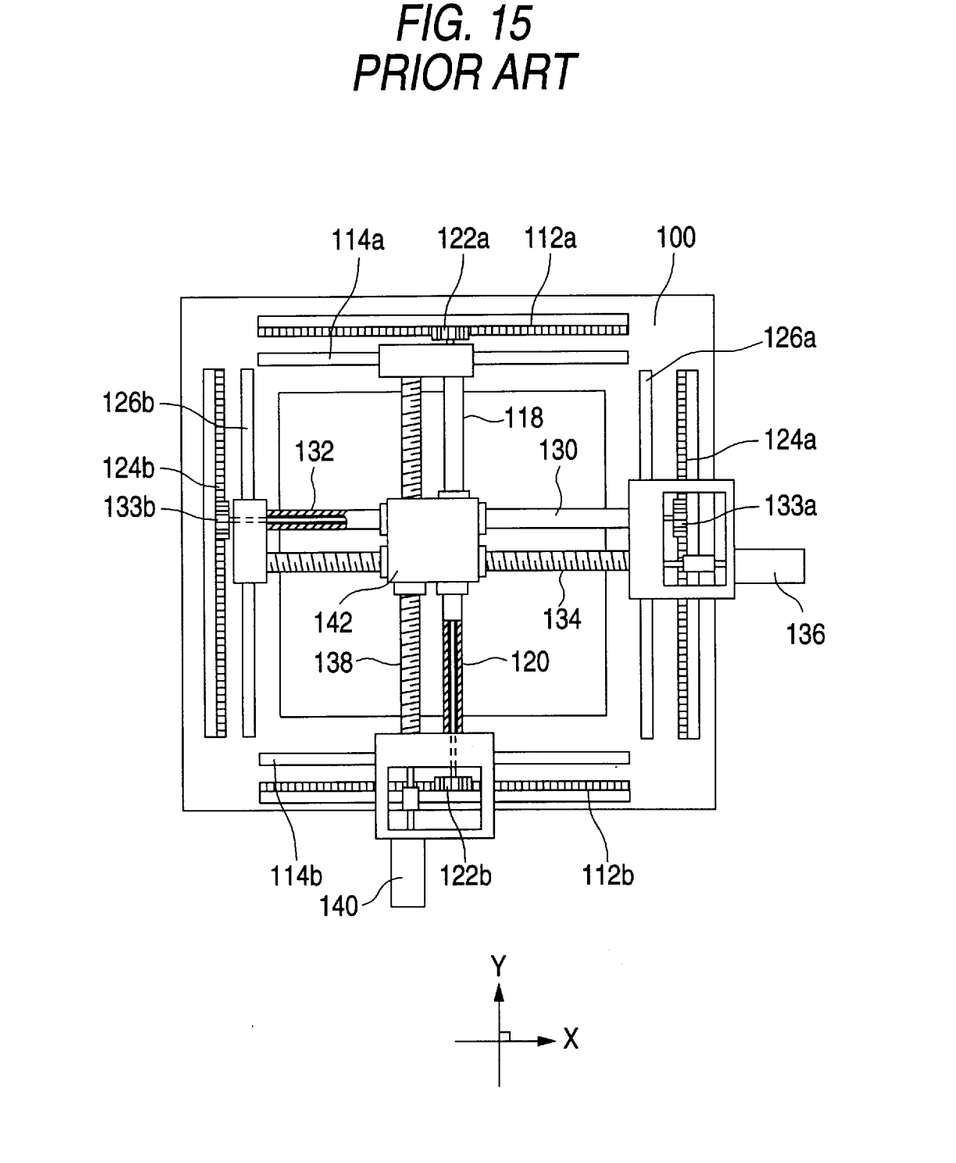
FIG. 15 is a plan view showing a conventional feeding apparatus.

An example of the conventional feeding apparatus is disclosed in Unexamined Japanese Patent Publication No. Hei. 5-92376. The feeding apparatus, as shown in FIG. 15, is a two-dimensional motion mechanism formed of various components assembled onto a base 100. In the feeding apparatus, a pair of X-axis guides 114a and 114b are arranged in parallel while being extended in the X-axial direction. A pair of Y-axis guides 126a and 126b are arranged in parallel while being extended in the direction at an angle to the X-axis direction. An X-axis slider guide 130 is disposed between the Y-axis guides 126a and 126b while being extended in the X-axis direction, and is movable along the Y-axis guides 126a and 126b in the Y-axis direction. A Y-axis slider guide 118 is arrayed between the X-axis guides 114a and 114b while being extended in the Y-axis direction, and is movable along the X-axis guides 114a and 114b in the X-axis direction.

A slider 142 is movable in the X- and Y-axis directions while being guided by the X-axis slider guide 130 and the Y-axis slider guide 118. Drive mechanisms 134, 136, 138 and 140 are provided for moving the slider 142 in the X- and Y-axis directions. An X-axis restraining device is mounted for restraining a slant of the X-axis slider guide 130 to the X-axis direction. A Y-axis restraining device is mounted for restraining a slant of the Y-axis slider guide 118 to the Y-axis direction.

The X-axis restraining device includes X-axis racks 112a and 112b, a Y-axis rod 120, and pinion gears 122a and 122b mounted at both ends of the rod. The Y-axis restraining device includes Y-axis racks 124a and 124b, an X-axis rod 132, and pinion gears 133a and 133b mounted on both ends of the rod. Those restraining devices restrain angular displacements of the slider 142 in the yawing direction when it is moved in the X- and Y-axis directions while being guided by the X-axis rod 132 and the Y-axis rod 120.

The two-dimensional motion mechanism as the conventional feeding apparatus has the following disadvantages:
1) Heavy members are used for the Y-axis rod 120 of the Y-axis restraining device and the X-axis rod 132 of the X-axis restraining device. The inertia of those heavy members forms an additional load to the drive mechanism.
2) The mechanism is complicated, and requires a large number of the component parts. This leads to increase of the cost to manufacture.
3) If flat belts, wires or the like are used in place of the rack-pinion mechanism or the timing belts for restraining angular displacements of the Y-axis rod 120 of the Y-axis restraining device and the X-axis rod 132 of the X-axis restraining device, then a slip of those rods 132 and 120 occurs. In this state, the drive force is improperly transmitted.

SUMMARY OF THE INVENTION

The present invention has been made in view of conventional circumstances and has an object to provide a feeding apparatus which is able to restrain a yawing motion of a movable body with a simple mechanism.

According to a first aspect of the present invention, the object is achieved by a feeding apparatus including: a base; a movable body elongated in a longitudinal direction orthogonal to a moving direction of the movable body on the base; a pair of linear guide devices arranged on the base in parallel with each other, for guiding the movable body in the moving direction; a linear drive device mounted on the base for moving the movable body along the linear guide device; and an attitude stabilizing device mounted on the base for restraining a yawing motion of the movable body, the attitude stabilizing device including at least one rope (transmission) member, first and second fastening points formed in the movable body for fixing the rope member, the first and second fastening points being separated from each other in the longitudinal direction, and first and second direction-changing devices mounted on the base and separated from each other in the moving direction, the first direction-changing device extending the rope member, which is fastened at the first fastening point, to a first direction, the second direction-changing device extending the rope member, which is drawn from the first direction-changing device, to a second direction in which the rope member is fastened at the second fastening point.

According to a second aspect of the present invention, the object is achieved by a feeding apparatus including: a base; a first movable body movable in an X-axis direction and elongated in a Y-axis direction orthogonal to the X-axis direction; a second movable body movable in the Y-axis direction and elongated in the X-axis direction; a pair of first and second linear guide devices arranged on the base in parallel with each other, for guiding the first and second movable body in the X-axis and Y-axis directions, respectively; first and second linear drive devices mounted on the base for moving the first and second movable body along the first and second linear guide devices, respectively; a coupling member coupling the first and second linear drive devices; and an attitude stabilizing device mounted on the base for restraining a yawing motion of the movable body, the attitude stabilizing device including first and second rope members, first and second fastening points mounted on the base for fixing the first rope member, the first and second fastening points being separated from each other with respect to the first movable body in the Y-axis direction, third and fourth fastening points formed in the second movable body for fixing the second rope member, the third and fourth fastening points being separated from each other with respect to the second movable body in the X-axis direction first and second direction-changing devices mounted on the first movable body and separated from each other in the Y-axis direction, and third, fourth and fifth direction-changing devices mounted on the base body, the first direction-changing device extending the first rope member, which is fastened at the first fastening point, to the Y-axis direction, the second direction-changing device extending the first rope member, which is drawn from the first direction-changing device, to the X-axis direction in which the first rope member is fastened at the second fastening points the third direction-changing device extending the second rope member, which is fastened at the third fastening point, to the fourth direction-changing device which is separated from the third direction-changing device with respect to the second movable body in the Y-axis direction, the fourth direction-changing device extending the second rope member, which is drawn from the third direction-changing device, to the fifth direction-changing device which is separated from the fourth direction-changing device with respect to the first movable body in the X-axis direction, the fifth direction-changing device extending the second rope member, which is drawn from the fourth direction-changing device, to the fourth fastening point.

The linear drive device is driven to apply a propelling force to the movable body in the direction at a right angle to the body moving direction. An acceleration is generated in the movable body. An inertia opposite in direction to the propelling force acts on the point of gravity of the movable body. When the propelling force and the inertia do not lie on a straight line, the inertia and the propelling force form a couple of forces which cause the movable body to horizontally turn with respect to the moving direction of the movable body. The yawing motion of the movable body is restrained by the rope member stretched over the attitude stabilizing device. As a result, the attitude of the movable body is stabilized.

DETAILED DESCRIPTION OF THE PREFERRED EMBODIMENTS

The preferred embodiments of the present invention will be described with reference to the accompanying drawings.

Figure 1:
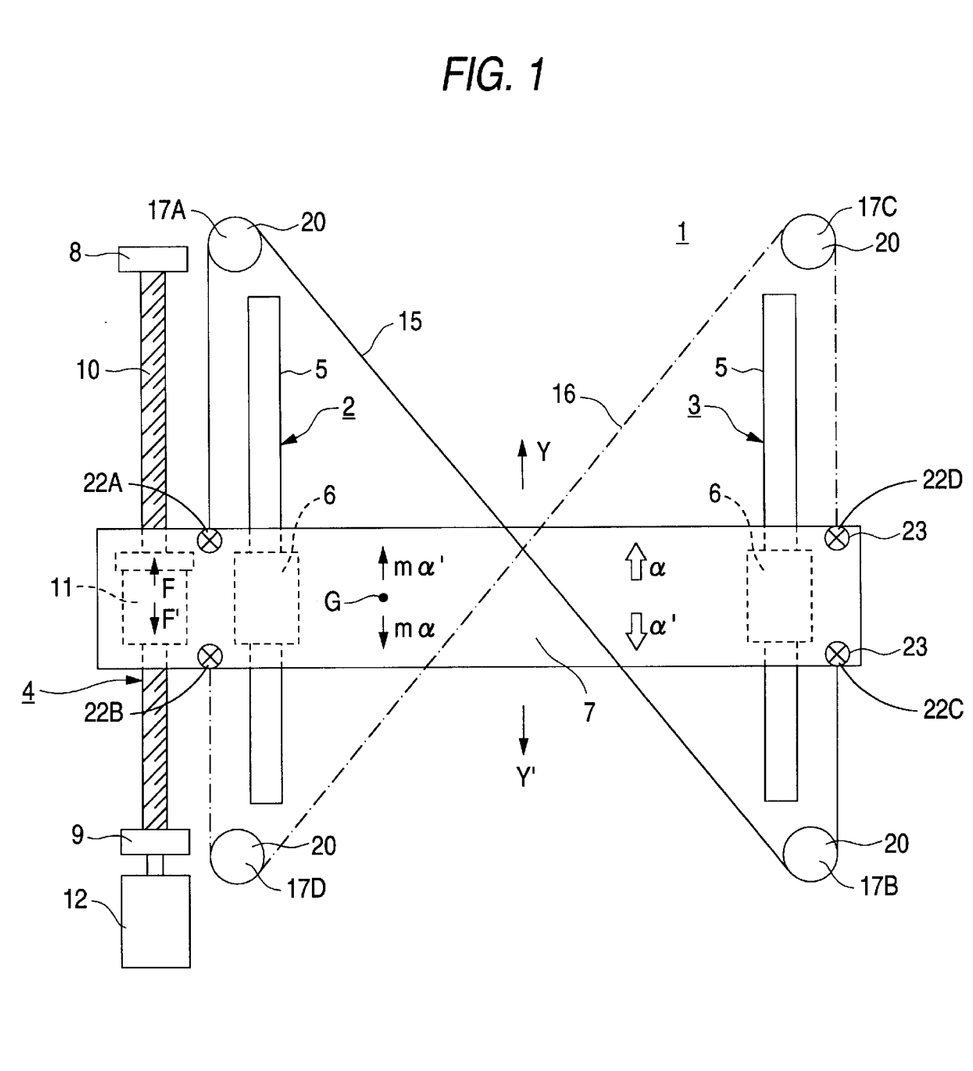
FIG. 1 is a plan view schematically showing a feeding apparatus according to a first embodiment of the present invention.

FIG. 1 is a plan view showing a scheme of a first embodiment of a feeding apparatus according to the present invention. As shown, a pair of linear guide devices 2 and 3, which are arranged in parallel and form a linear guide mechanism, are disposed on a base 1. A ball-screw device 4 as a linear drive mechanism is disposed parallel to the linear guide devices 1 and 3. Sliders 6 are mounted on the linear guide devices 2 and 3, respectively, in a state that the sliders 6 are smoothly movable while being guided by guide rails 5 fixedly mounted on the base 1. A movable body 7 is put on the two sliders 6. The movable body 7 is elongated in the direction at a right angle to the moving direction thereof. The ball-screw device 4 is rotatably supported at both ends by supports 8 and 9. A screw shaft 10 is screwed into a nut 11, with a plurality of balls (not shown) being interposed therebetween. The screw shaft 10 is mounted on the base 1. The end part of the movable body 7 is fastened to the nut 11. One end of the screw shaft 10 is firmly coupled with a reversible motor 12. When the motor 12 is driven, the screw shaft 10 is turned, and the nut 11 and hence the movable body 7 is moved forwardly or backwardly along the rails 5 of the linear guide devices 2 and 3.

The feeding mechanism for feeding the movable body, used in the feeding apparatus of the present invention is thus constructed.

Next, an attitude stabilizing device for stabilizing an attitude of the movable body will be described.

The attitude stabilizing device includes two rope (transmission) members (for example, wires) 15 and 16, and four direction-changing mechanisms 17A, 17B, 17C and 17D. The direction-changing mechanisms 17A, 17B, 17C and 17D are the same in structure. The structure of one of the direction-changing mechanisms is typically illustrated in FIG. 2. As shown, a pulley 20 is coupled with a fixed shaft 18 projecting on the base 1 in a state that a bearing 19, such as a ball bearing, is interposed between them. In the present embodiment, the four direction-changing mechanisms are mounted on the base 1 at four locations that are point symmetrically arrayed and close to the ends of the rails 5.

Four wire fastening points 22A, 22B, 22C and 22D, to which the ends of the wires 15 and 16 are fixed, are arranged at locations close to the four corners of the movable body 7, while being point symmetrically arrayed. Tension adjusting mechanisms 23 are mounted in associated with the two wire fastening points 22C and 22D.

Figure 3:
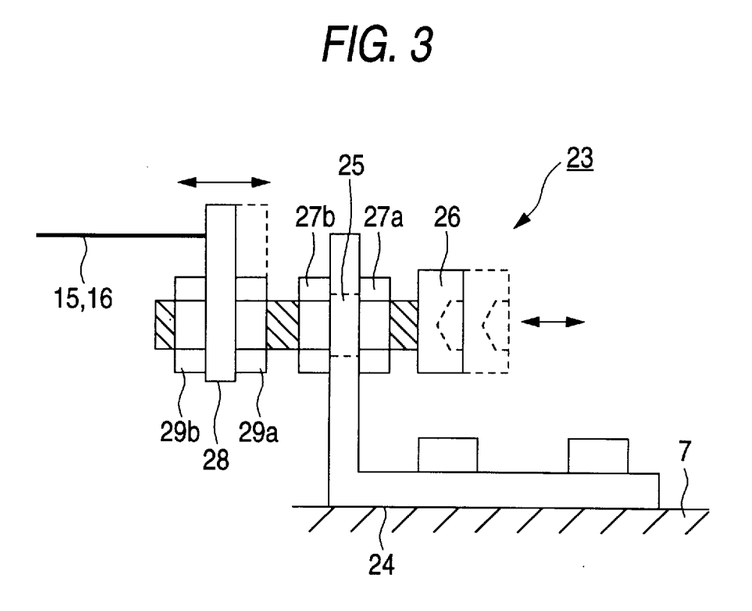
FIG. 3 is a side view showing a tension adjusting mechanism used in the feeding apparatus of FIG. 1.

The structure of one tension adjusting mechanism is typically illustrated in FIG. 3. As shown, an L-shaped member 24 is fixed to the movable body 7 by a bolt. A through hole 25 is formed in the upper part of the upright leg of the L-shaped member 24. A bolt 26 is screwed into the through hole 25, a couple of nuts 27a and 27b, a wire fixing plate 28, and another couple of nuts 29a and 29b. As a result, the wire fixing plate 28 is coupled with the distal end part of the bolt 26. The nuts 27a, 27b, 29a and 29b are located such that the nuts 27a and 27b hold the upright leg of the L-shaped member 24, and the nuts 29a and 29b hold the wire fixing plate 28. To adjust a tension of the wire 15 or 16, the bolt 26 is moved forward and backward by adjusting the couple of the nuts 27a and 27b, and the wire fixing plate 28 is moved forward and backward by adjusting the couple of the nuts 29a and 29b.

To mount the wire 15, one end of the wire 15 is fastened to the wire fastening point 22A. The remaining part of the wire is led to and put on the pulley 20 of the direction-changing mechanism 17A where the wire is changed in the leading direction. Then, it is led to and put on the pulley 20 of the direction-changing mechanism 17B, located on the opposite side of the movable body 7 when viewed from the direction-changing mechanism 17A. At the pulley, the leading direction of the wire is changed again. Finally, it is led to the tension adjusting mechanism 23 provided at the wire fastening point 22C, which is substantially point symmetrical with the wire fastening point 22A, and the other and of the wire is fastener to the tension adjusting mechanism 23. The thus mounted wire 15 is extended like a Z-shape when viewed from above.

To mount the wire 16, one end of the wire 16 is fastened to the wire fastening point 22B. The remaining part of the wire is led to and put on the pulley 20 of the direction-changing mechanism 17D where it is changed in its leading direction. Then, it is led to and put on the pulley 20 of the direction-changing mechanism 17C, located on the opposite side of the movable body 7 when viewed from the direction-changing mechanism 17D. The leading direction of the wire is changed again at the pulley. Finally, it is led to the tension adjusting mechanism 23 mounted at the wire fastening point 22D, which is substantially point symmetrical with the wire fastening point 22B, and the other end of the wire is fastened to the tension adjusting mechanism 23. The thus mounted wire 16 is extended like an inverse Z-shape when viewed from above.

When the wires 15 and 16 are put over the direction-changing mechanisms 17A, 17B, 17C and 17D, the wires may be merely put on the pulleys 20, but if required, those may be wound around the associated direction-changing mechanisms, by one turn.

The operation of the feeding apparatus thus constructed will be described.

The motor 12 is turned in one direction to turn the screw shaft 10 of the ball-screw device 4. With the turn of the screw shaft 10, a force F is applied to the movable body 7 through the nut 11, to move the movable body 7 in the direction of an arrow Y. At this time, as shown in FIG. 1, an acceleration α as generated in the movable body 7 (of the total mass m) integrally coupled with the nut 11, and an inertia mα acts on a center point G of gravity. The inertia mα and the force F form a couple of forces which cause the movable body 7 to turn clockwise in FIG. 1 (cause a yawing motion of the movable body 7). However, a tension of the wire 16, which is stretched between the wire fastening points 22B and 22D through the direction-changing mechanisms 17C and 17D, restrains the clockwise yawing motion of the movable body 7.

When the motor 12 is reversely turned, a force F' is applied to the movable body 7, and the movable body 7 is moved in the direction of an arrow Y', an acceleration α' is generated in the movable body 7 (of the total mass m) integrally coupled with the nut 11, and an inertia mα' acts on the center point G of gravity. The inertia mα' causes the movable body 7 to turn counterclockwise in FIG. 1. However, a tension of the wire 15, which is stretched between the wire fastening points 22A and 22C through the direction-changing mechanisms 17A and 17B, restrains the counterclockwise yawing motion of the movable body 7.

The wires 15 and 16 are put on the direction-changing mechanisms 17A to 17D in a stretched fashion, with both ends of each wire being fastened to the movable body 7. Because of this wire mounting, no slip of the wires occurs if the wires are merely put on the pulleys of the direction-changing mechanisms 17A to 17D.

Figure 2:
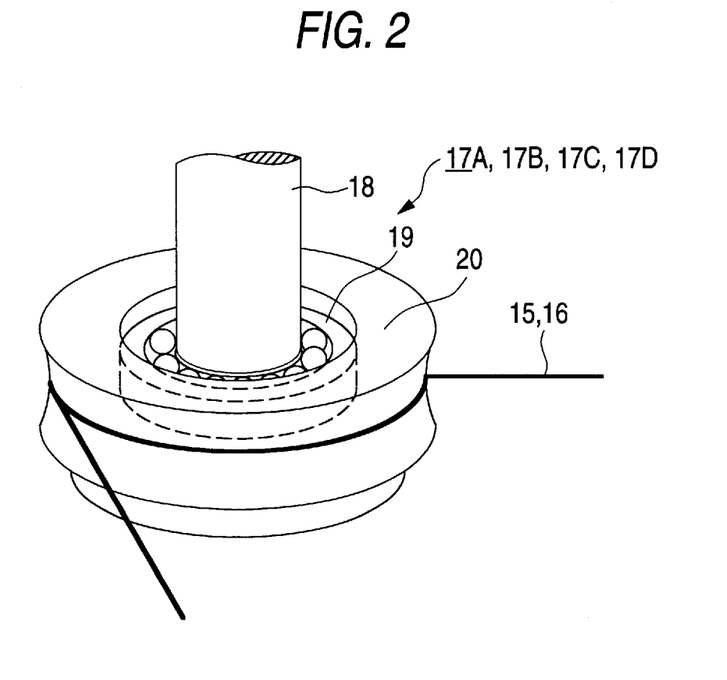
FIG. 2 is a perspective view showing a direction-changing mechanism used in the feeding apparatus of FIG. 1.

When the wires 15 and 16 are each wound around the pulley 20 by at least one turn as shown in FIG. 2, no slip of the wires occurs. Further, the following additional advantage is created. When the movable body 7 is rapidly accelerated or decelerated, the wires 15 and 16 are tightened and firmly held by the direction-changing mechanisms 17A to 17D closest to them. As a result, the wire rigidity is increased, and a twist of the movable body 7 is reduced. In consequence, the wires 15 and 16 are more durable.

The feeding apparatus thus constructed does not include such a member as the conventional heavy rod to greatly increase the load inertia of the movable body 7. Accordingly, the load of the motor 12 is small.

Further, the mechanism of the feeding apparatus is simple, and hence the cost to manufacture it is low.

Figure 4A:
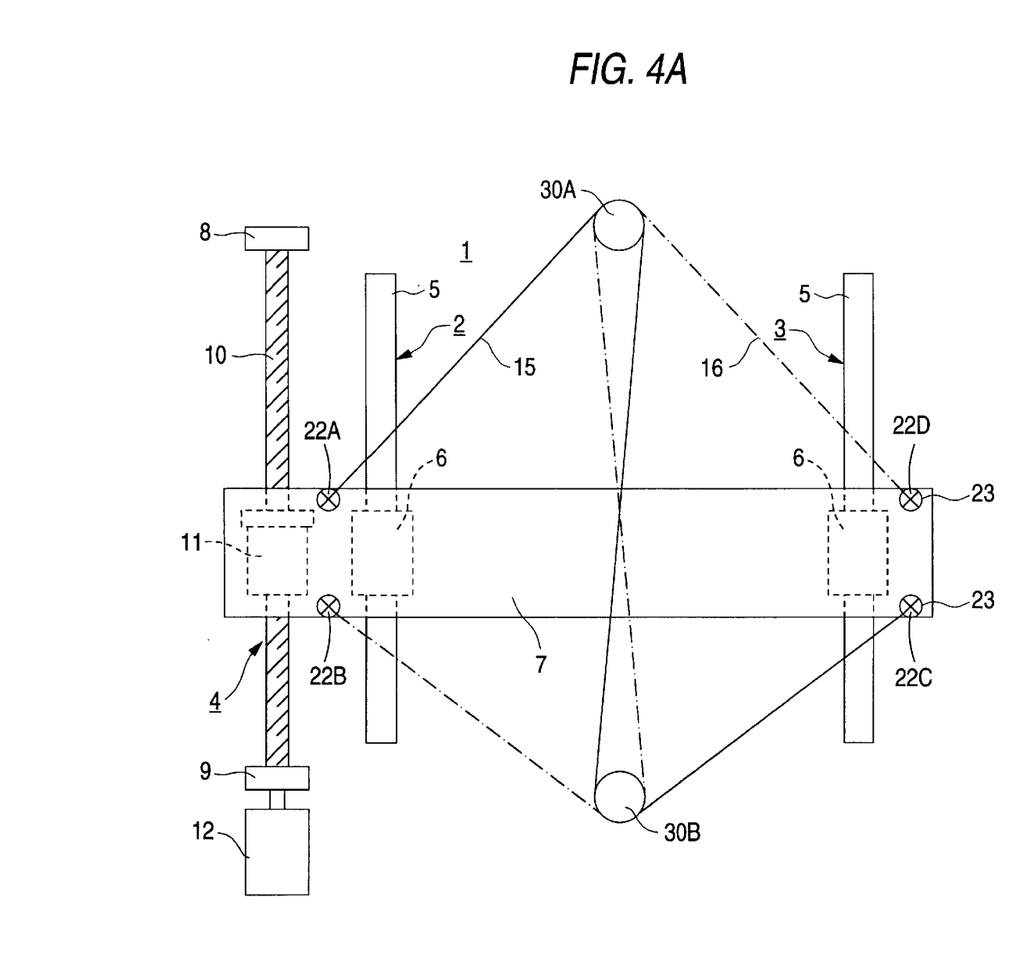
FIG. 4A is a plan view schematically showing a feeding apparatus according to a second embodiment of the present invention.

FIG. 4 is a plan view schematically showing a feeding apparatus according to a second embodiment of the present invention. In the figure, like or equivalent portions are designated by like reference numerals in the figures of the first embodiment. The same thing is correspondingly applied to other embodiments to subsequently be described.

Figure 4B:
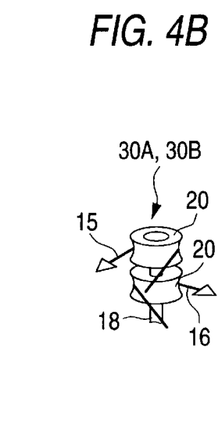
FIGS. 4B and 4C are side views each showing a twin-pulley direction-changing mechanism in the second embodiment.
Figure 4C:
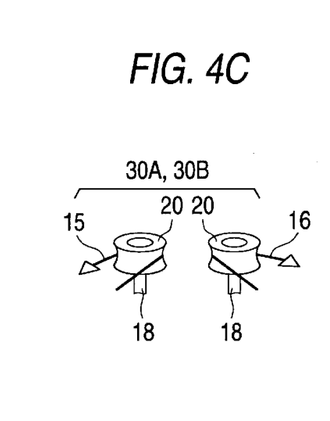

An attitude stabilizing device used in the second embodiment includes two wires 15 and 16, and two twin-pulley direction-changing mechanisms 30A and 30B. The twin-pulley direction-changing mechanisms 30A and 30B, mounted on the base 1, are each placed at the mid position between the linear guide devices 2 and 3 at each of both ends of the base when viewed in the moving direction of the movable body. The twin-pulley direction-changing mechanisms 30A and 30B are each constructed with a couple of pulleys 20, which are independently rotatably arranged one on the other or side by side as shown in FIGS. 4B and 4C. Wires are put on those pulleys 20, respectively.

To mount the wire 15, one end of the wire 15 is fastened to the wire fastening point 22A. The remaining part of the wire is led to and put on one of the pulleys 20 of the twin-pulley direction-changing mechanism 30A where the wire is changed in the leading direction. Then, it is led to and put on one of the pulleys 20 of the twin-pulley direction-changing mechanism 30B, located on the opposite side of the movable body 7 when viewed from the direction-changing mechanism 30A. At the pulley 20, the leading direction of the wire is changed again. Finally, it is led to the tension adjusting mechanism 20 23 provided at the wire fastening point 22C, and the other end of the wire is fastened to the tension adjusting mechanism 23. The thus mounted wire 15 is extended like a Z-shape when viewed from above.

To mount the wire 16, one end of the wire 16 is fastened to the wire fastening point 22B. The remaining part of the wire is led to and put on the other pulley 20 of the twin-pulley direction-changing mechanism 30B where the wire is changed in the leading direction. Then, it is led to and put on the other pulley 20 of the twin-pulley direction-changing mechanism 30A, located on the opposite side of the movable body 7 when viewed from the direction-changing mechanism 30B. At the pulley 20, the leading direction of the wire is changed again. Finally, it is led to the tension adjusting mechanism 23 mounted at the wire fastening point 22D, and the other end of the wire is fastened to the tension adjusting mechanism 23. The thus mounted wire 16 is extended like an inverse Z-shape when viewed from above.

The twin-pulley direction-changing mechanism 30A of the second embodiment is equivalent to the direction-changing mechanisms 17A and 17C in the first embodiment, which are coupled together. The twin-pulley direction-changing mechanism 30B is equivalent to the direction-changing mechanisms 17B and 17D in the first embodiment, which are coupled together. The operation and the effects of the second embodiment are substantially equal to those of the first embodiment.

A third embodiment of the present invention will be described.

Figure 5:
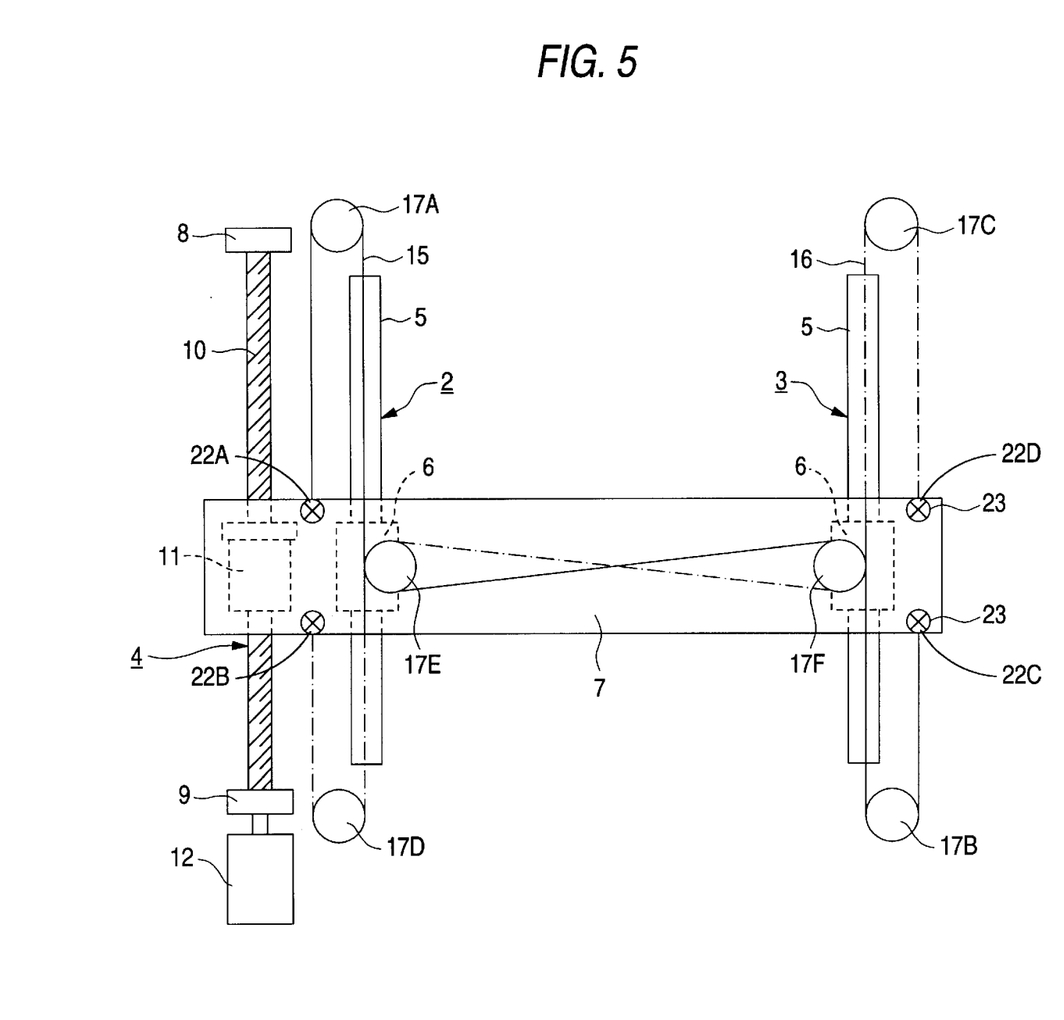
FIG. 5 is a plan view schematically showing a feeding apparatus according to a third embodiment of the present invention.

An attitude stabilizing device of the third embodiment is the same an that shown in FIG. 1 in that the attitude stabilizing device includes two wires 15 and 16, and four direction-changing mechanisms 17A to 17D located at the four corners on the base 1, but is different from the attitude stabilizing device of the first embodiment in that a couple of direction-changing mechanisms 17E and 17F are mounted on the movable body 7, while being spaced from each other in the longitudinal direction.

To mount the wire 15, one end of the wire 15 is fastened to the wire fastening point 22A, and the remaining part of the wire is led to and put on the direction-changing mechanism 17A where its leading direction is changed 180°. The wire is further led to and put on the direction-changing mechanism 17E on the movable body 7 where it is turned sideways. Then, the wire is led on the movable body 7 toward the direction-changing mechanism 17F and put thereon where it is turned downward, and led to and put on the direction-changing mechanism 17B where it is turned 180°. Finally, the wire is led to the tension adjusting mechanism 23 located at the wire fastening point 22C, and the other end of the wire is fastened to the tension adjusting mechanism 23.

To mount the wire 16, one end of the wire 16 is fastened to the wire fastening point 22B, and the remaining part of the wire is led to and put on the direction-changing mechanism 17D where its leading direction is changed 180°. The wire is further led to and put on the direction-changing mechanism 17E on the movable body 7 where it is turned sideways. Then, the wire is led on the movable body 7 toward the direction-changing mechanism 17F and put thereon where it is turned upward, and led to and put on the direction-changing mechanism 17C where it is turned 180°. Finally, the wire is led to the tension adjusting mechanism 23 located at the wire fastening point 22D and the other end of the wire is fastened to the tension adjusting mechanism 23.

The pulleys 20 shown in FIG. 2 may be used for the pulleys of the direction-changing mechanisms 17E and 17F mounted on the movable body 7. The wires 15 and 16 are put on each pulley in the opposite directions. Accordingly, the leading directions of the wires can be simultaneously changed by one pulley because both the wires are moved in the same direction as the rotating direction of the pulley. The wire 15 restrains a counterclockwise motion of the movable body 7, and the wire 16 restrains a clockwise motion of the same.

In the third embodiment, the wires 15 and 16 are drawn along the rails 5 of the linear guide device and the movable body 7. In other words, those wires are not located in the central portion of the feeding apparatus when viewed in the width direction. Accordingly, the entire central portion may be used as a working area. Further, if another mechanism is installed in this portion, it will not interfere with the wires.

Figure 6:
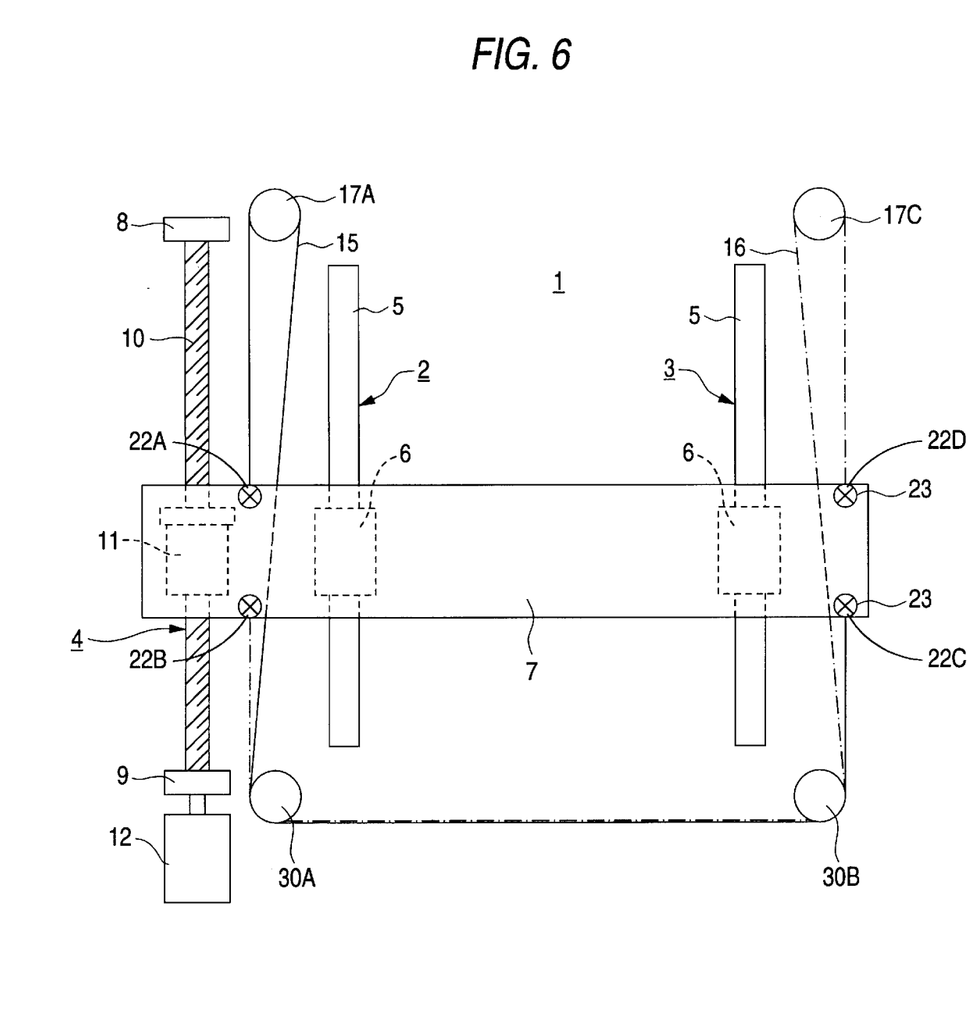
FIG. 6 is a plan view schematically showing a feeding apparatus according to a fourth embodiment of the present invention.

FIG. 6 is a plan view schematically showing a feeding apparatus according to a fourth embodiment of the present invention.

As shown, an attitude stabilizing device of the fourth embodiment includes two wires 15 and 16, two direction-changing mechanisms 17A and 17C disposed at the left and the right corners on one side of the base 1 (upper portion when viewed in the drawing), and two twin-pulley direction-changing mechanisms 30A and 30B at the left and the right corners on the other side of the base 1 (lower portion when viewed in the drawing).

To mount the wire 15, one end of the wire 15 is fastened to the wire fastening point 22A, the remaining part of the wire is led to and put on the direction-changing mechanism 17A where it is turned 180°. Then, it is led to one of the pulleys of the twin-pulley direction-changing mechanism 30A, located on the opposite side of the movable body 7 when viewed from the direction-changing mechanism 17A, after traversing the underside of the movable body 7. The wire is turned sideways or to the right (when viewed in the drawing) and led to the twin-pulley direction-changing mechanism 30B located at the opposite corner of the base 1. The wire is turned upward at one of the pulleys of the twin-pulley direction-changing mechanism 30B, and led to the wire fastening point 22C. Finally, the other end of the wire is fastened to the tension adjusting mechanism 23 provided at the wire fastening point 22C.

To mount the wire 16, one end of the wire 16 is fastened to the wire fastening point 22B and the remaining part of the wire is led to the twin-pulley direction-changing mechanism 30A. By the other pulley of the twin-pulley direction-changing mechanism 30A, the wire is turned to the right, and guided along the wire 15 to the twin-pulley direction-changing mechanism 30B. By the other pulley of the twin-pulley direction-changing mechanism 30B, the wire is turned upward and led to the direction-changing mechanism 17C after traversing the underside of the movable body 7. At the direction-changing mechanism 17C, the wire is turned 180° and led to the wire fastening point 22D. Finally, the other end of the wire is fastened to the tension adjusting mechanism 23 of the wire fastening point 22D.

The wire 15 restrains a counterclockwise motion of the movable body 7, and the wire 16 restrains a clockwise motion of the same.

In the fourth embodiment, the wires 15 and 16 are extended along the three sides of the base 1. Accordingly, the central portion of the apparatus may be used as a working area over the entire range of the movement of the movable body 7. If another mechanism is installed in this portion, it will not interfere with the wires. Further, no wire is present on the movable body 7 Because of this, if another mechanism is installed on the movable body 7, it will not interfere with the wires.

Figure 7:
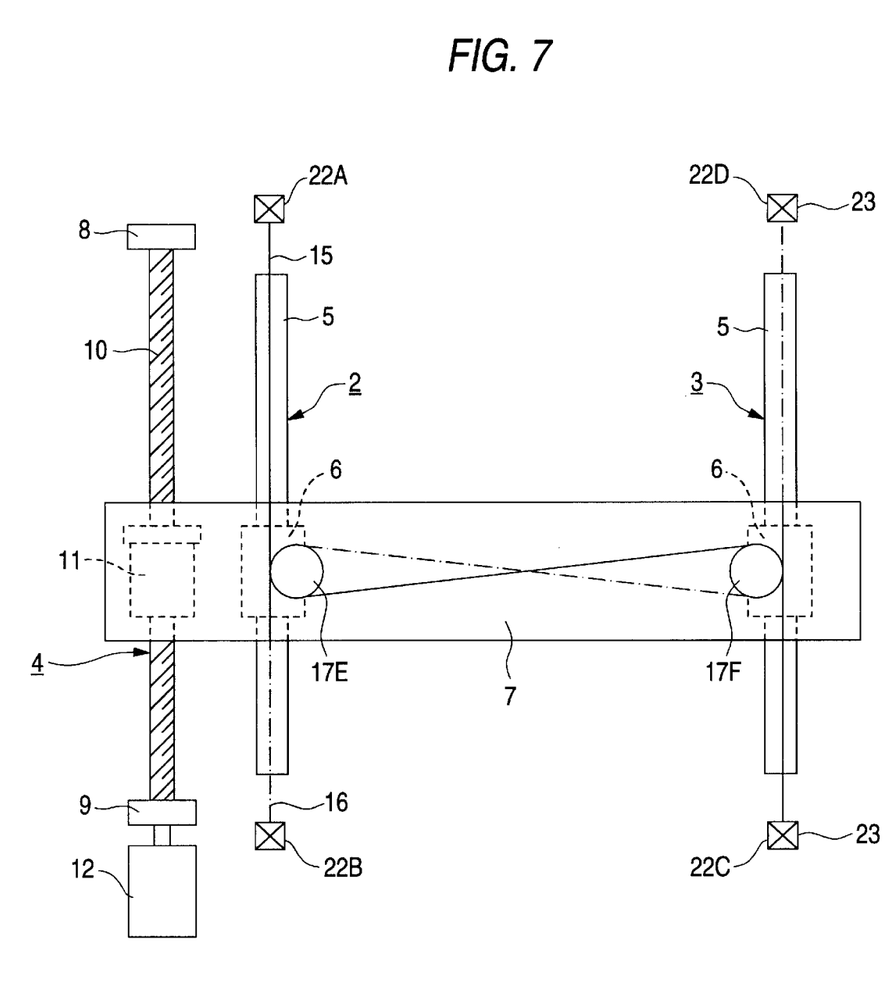
FIG. 7 is a plan view schematically showing a feeding apparatus according to a fifth embodiment of the present invention.

FIG. 7 is a plan view schematically showing a feeding apparatus according to a fifth embodiment of the present invention.

In an attitude stabilizing device of the fifth embodiment, the wire fastening points 22A, 22B, 22C and 22D to which two wires 15 and 16 are fastened are arranged at the four corners of the base 1 in a point-symmetrical fashion. Two direction-changing mechanisms 17E and 17F are disposed on the movable body 7, as in the embodiment of FIG. 5.

In mounting the wire 15, one end of the wire 15 is fastened to the wire fastening point 22A, and the remaining part of the wire is drawn toward and put on the direction-changing mechanism 17E on the movable body 7. By the mechanism 17E, the wire is drawn to the direction-changing mechanism 17F along and on the movable body 7 and put on the mechanism 17F. By the mechanism 17F, the wire is turned downward to the wire fastening point 22C. Finally, the other end of the wire 15 is fastened to the tension adjusting mechanism 23 at the wire fastening point 22C.

In mounting the wire 16, one end of the wire 16 is fastened to the wire fastening point 22B, and the remaining part of the wire is drawn toward and put on the direction-changing mechanism 17E in the direction, which is opposite to that in which the wire 15 is put thereon. By the mechanism 17E, the wire is drawn to the direction-changing mechanism 17F along and on the movable body 7 and put on the mechanism 17F in the direction, which is opposite to that in which the wire 15 is put thereon. By the mechanism 17F, the wire is turned upward to the wire fastening point 22D. Finally, the other end of the wire 15 is fastened to the tension adjusting mechanism 23 at the wire fastening point 22D.

The wire 15 restrains a counterclockwise motion of the movable body 7, and the wire 16 restrains a clockwise motion of the same.

In the fifth embodiment, the wires 15 and 16 are drawn along the rails 5 of the linear guide device and the movable body 7. Therefore, the areas on both sides of the movable body 7 when viewed is the moving direction of the apparatus may be used for a working area.

FIGS. 8 through 14 cooperate to show a feeding apparatus according to a sixth embodiment of the present invention.

Figure 8:
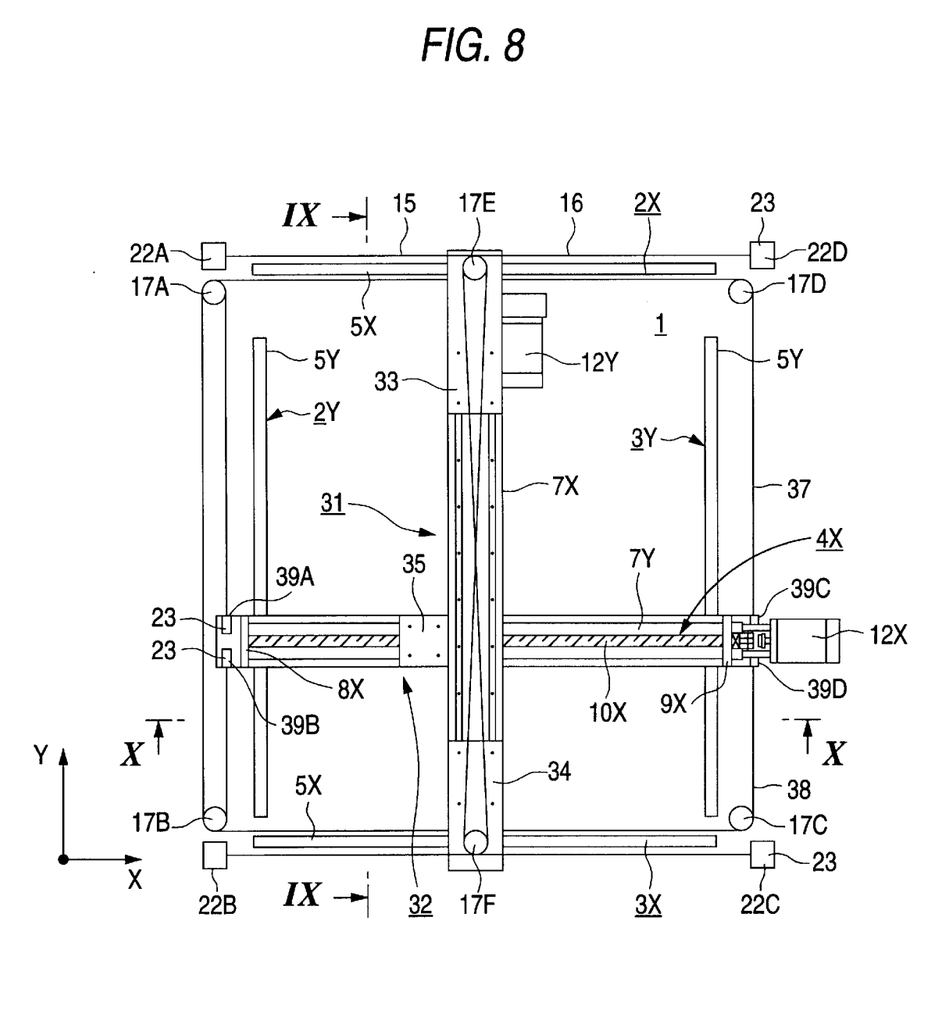
FIG. 8 is a plan view schematically showing a feeding apparatus according to a sixth embodiment of the present invention.
Figure 9:
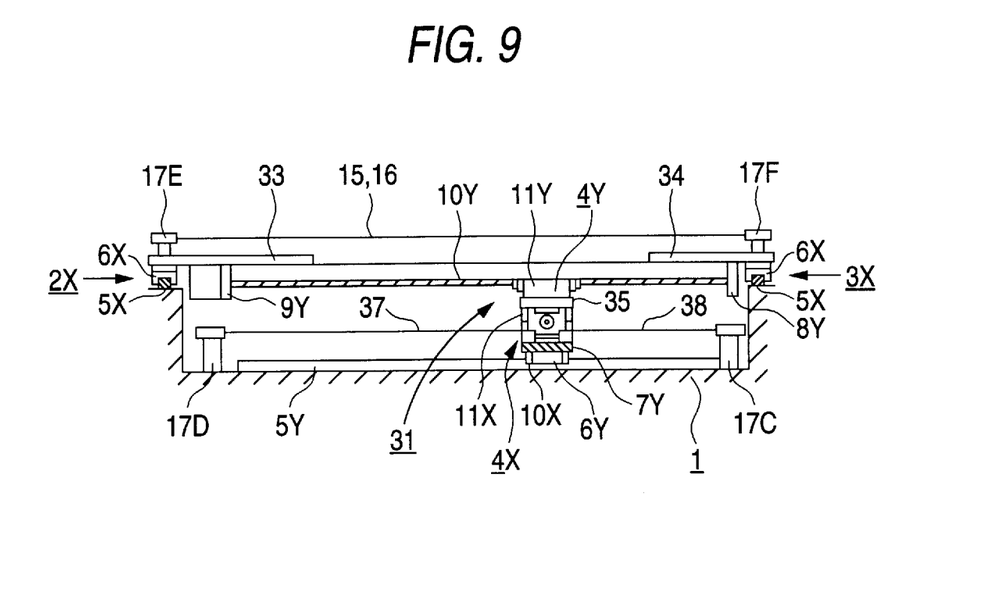
FIG. 9 is a cross sectional view taken on line IX—IX in FIG. 8.
Figure 10:
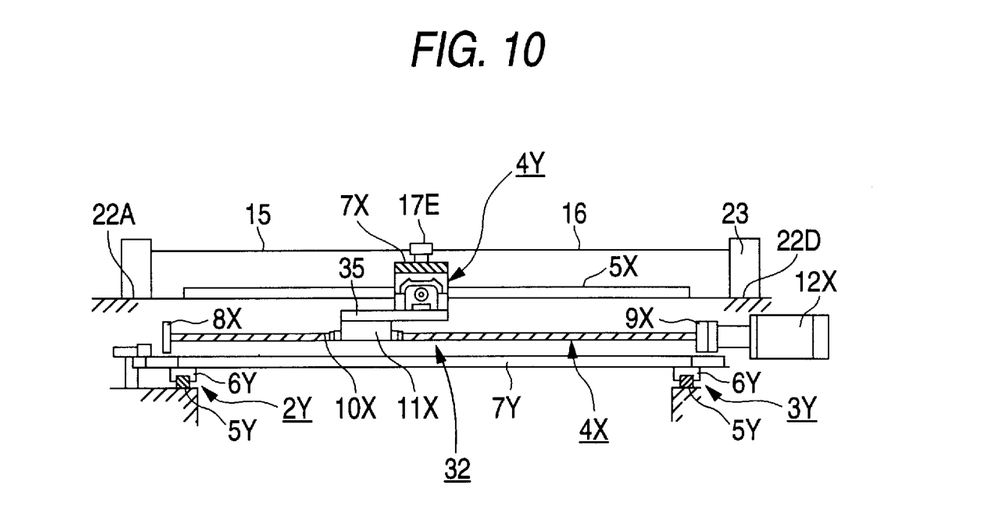
FIG. 10 is a cross sectional view taken on line X—X in FIG. 8.

The feeding apparatus of the present invention is an X-Y feeding apparatus. The X-Y feeding apparatus includes an X-axis feeding device 31 having a movable body 7X movable in the X-axis direction, and a Y-axis feeding device 32 having a movable body 7Y movable in the Y-axis direction orthogonal to the X-axis direction. The feeding structure of the X-Y feeding apparatus will first be described. In the X-axis feeding device 31, a pair of linear guides 2X and 3X, located both ends of the base 1 when viewed in the Y-axis direction, are arranged in parallel and extended horizontally or in the X-axis direction. The movable body 7X is carried on sliders 6X mounted on guide rails 5X, through scales 33 and 34. The movable body 7X is elongated in the direction at a right angle to the moving direction of the sliders. In the Y-axis feeding device 32, a pair of linear guides 2Y and 3Y, located both ends of the base 1 when viewed in the X-axis direction, are arranged in parallel and extended vertically or in the Y-axis direction. The movable body 7Y is carried on sliders 6Y mounted on guide rails 5Y. The movable body 7Y is elongated in the direction at a right angle to the moving direction of the sliders. A ball-screw device 4Y as a drive mechanism for the movable body 7Y is carried on the movable body 7X. The ball-screw device 4Y includes a screw shaft 10Y rotatably supported by supports 8Y and 9Y, a nut 11Y coupled with the screw shaft, and a drive motor 12Y for driving the screw shaft 10Y. A ball-screw device 4X as a drive mechanism for the movable body 7X is carried on the movable body 7Y. The ball-screw device 4X includes a screw shaft 10X rotatably supported by supports BX and 9X, a nut 11X coupled with the screw shaft, and a drive motor 12X for driving the screw shaft 10X. The nut 11X of the ball-screw device 4X is coupled with the nut 11Y of the ball-screw device 4Y through a coupling plate 35.

Attitude stabilizing devices for the movable bodies 7X and 7Y in the X-Y feeding apparatus will be described hereinafter.

Figure 11:
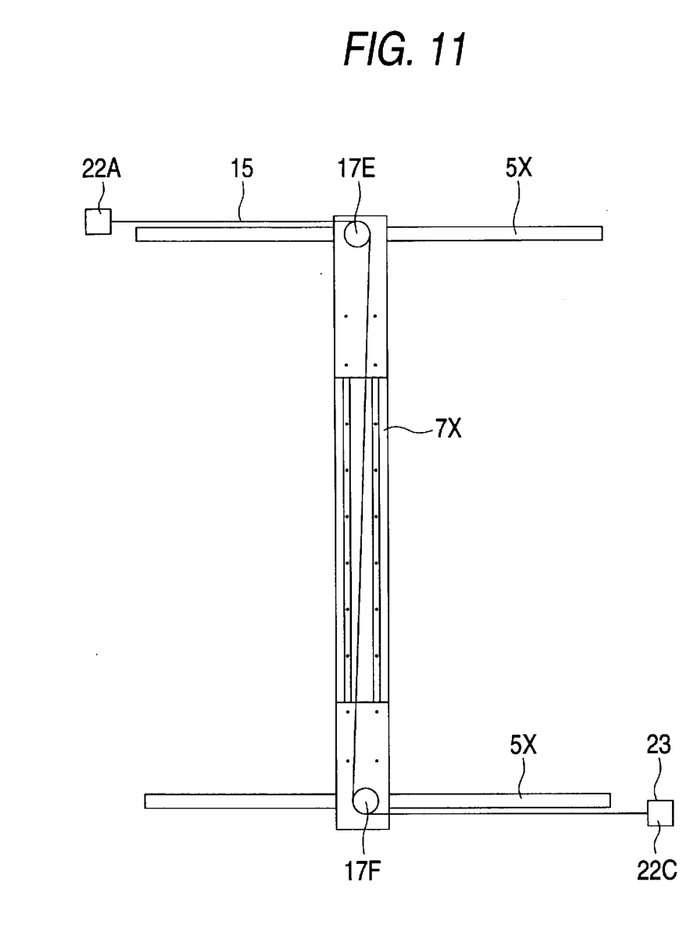
FIG. 11 is a diagram showing an arrangement of a first wire in the feeling apparatus of FIG. 8.
Figure 12:
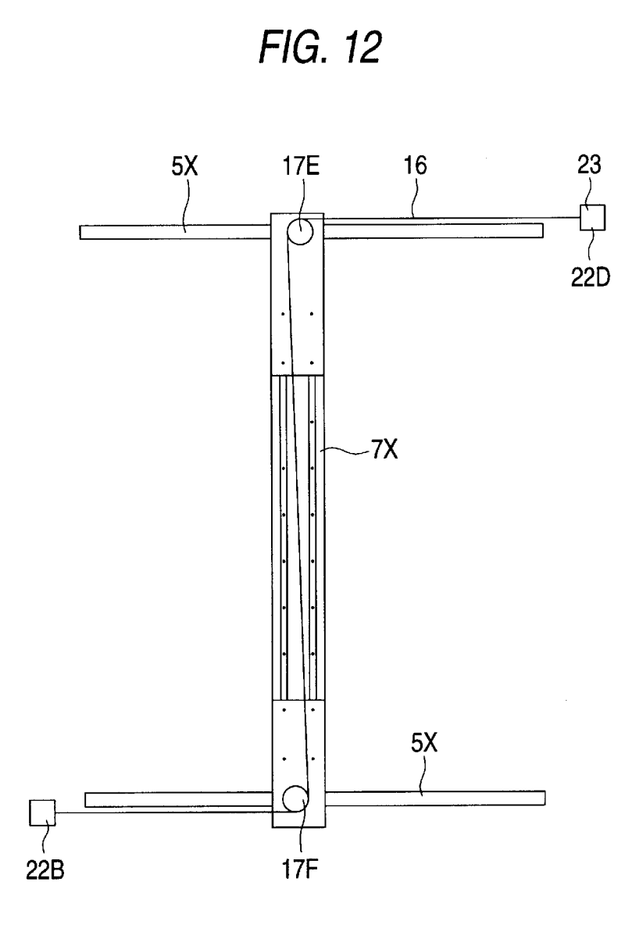
FIG. 12 is a diagram showing an arrangement of a second wire in the feeling apparatus of FIG. 8.

The attitude stabilizing device of the movable body 7X is the same as that for the movable body 7 in the feeding apparatus of the fifth embodiment shown in FIG. 7. The attitude stabilizing device includes two wires 15 and 16, two direction-changing mechanisms 17E and 17F mounted on the movable body 7X, and four wire fastening points 22A, 22B, 22C and 22D located at the four corners on the base 1. Of those wire fastening points, tension adjusting mechanisms 23 are mounted at the two wire fastening points 22C and 22D, respectively. As shown in FIG. 11, one end of the wire 15 is fastened to the fastening point 22A, and led to and put on the direction-changing mechanisms 17E and 17F, and led to the fastening point 22C. The other end of the wire 15 is fastened to the tension adjusting mechanism 23 of the fastening point 22C. The wire 15 thus mounted is extended like a Z-shape when viewed from above. As shown in FIG. 12, one end of the wire 16 is fastened to the tension adjusting mechanism 23 of the fastening point 22D, and led to and put on the direction-changing mechanisms 17E and 17F in the direction, which is opposite to that in which the wire 15 is put thereon. The wire is led from the direction-changing mechanisms to the fastening point 22B, and the other and of the wire 16 is fastened to the fastening point 22B. The wire 16 thus mounted is extended like an inverse Z-shape when viewed from above. The wire 15 restrains a counterclockwise motion of the movable body 7X, and the wire 16 restrains a clockwise motion of the same.

Figure 13:
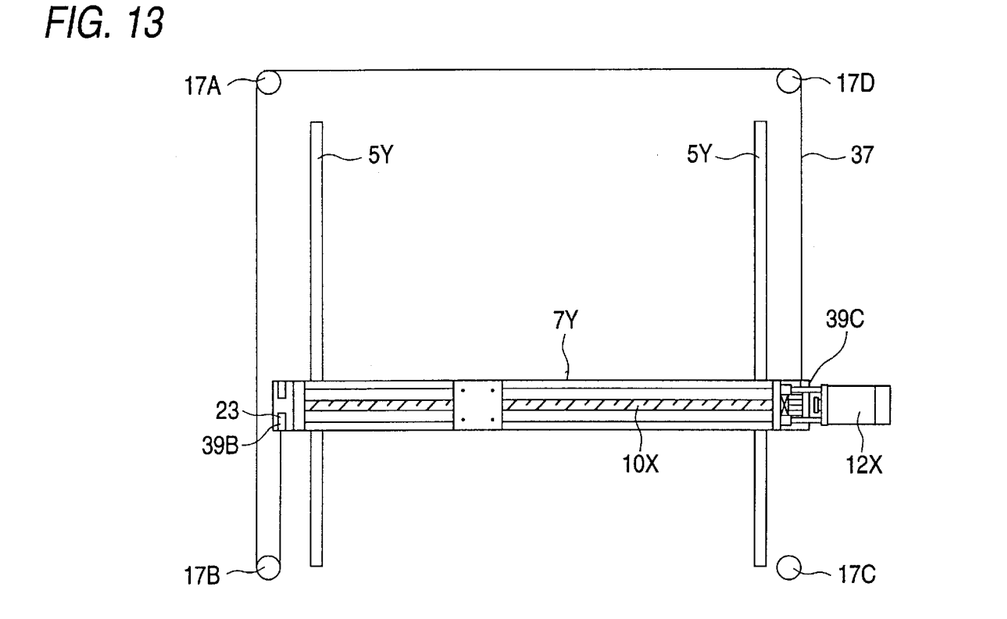
FIG. 13 is a diagram showing an arrangement of a third wire in the feeling apparatus of FIG. 8.
Figure 14:
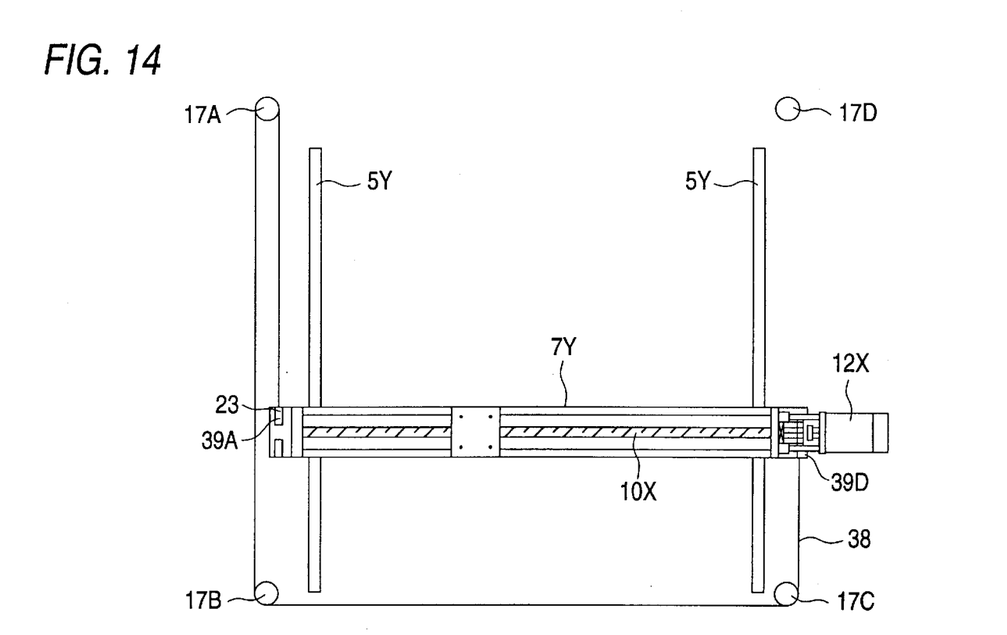
FIG. 14 is a diagram showing an arrangement of a fourth wire in the feeding apparatus of FIG. 8.

The attitude stabilizing device for the movable body 7Y includes two wires 37 and 38, four direction-changing mechanisms 17A to 17D mounted on the base 1, and four wire fastening points 39A to 39D mounted on both ends of the movable body 7Y when viewed in the longitudinal direction of the body. Of those wire fastening points, tension adjusting mechanisms 23 are located at the two wire fastening points 39A and 39B, respectively. As shown in FIG. 13 one end of the wire 37 is fastened to the tension adjusting mechanism 23 of the fastening point 39B, and led to and put on the direction-changing mechanisms 17B, 17A and 17D, and led to the fastening point 39C. The other end of the wire 16 is fastened to the tension adjusting mechanism 23 of the fastening point 39C. As shown in FIG. 14, one end of the wire 38 is fastened to the tension adjusting mechanism 23 of the fastening point 39A, and led to and put on the direction-changing mechanisms 17A, 17B and 17C in the direction, which is opposite to that in which the wire 37 is put thereon. The wire is led from the direction-changing mechanisms to the fastening point 39D, and the other end of the wire 38 is fastened to the fastening point 39D. The wire 37 restrains a counterclockwise motion of the movable body 7Y, and the wire 38 restrains a clockwise motion of the name. The attitude stabilizing device for the movable body 7Y may be substituted by the attitude stabilizing device for the movable body 7 in the fourth embodiment shown in FIG. 6.

The X-Y feeding apparatus of the sixth embodiment secures broad working areas in two axial directions, and restrains the yawing motions of the two movable bodies 7X and 7Y.

In the embodiments described above, the rope or transmisssion member is the wire. If required, a flat belt, a chain, a coiled spring or the like may be used for the rope or transmission member.

The ball-screw device, which is used for the linear drive device for linearly moving the movable body in the above-mentioned embodiment, may be substituted by a timing belt feeding mechanism or a rack-pinion feeding mechanism.

The tension adjusting mechanism is not limited to that constructed shown in FIG. 3, but may be modified to have a spring assembled thereinto.

Two wires are used in the embodiments. In an alternative, a single wire is introduced between the fastening points 22A and 22B not having the tension adjusting mechanisms 23, and fixed to these points (or one of the points).

Further, a single wire may be mounted several rounds through the same path, or a plurality of wires may be mounted through the same path. Because of so doing, a rigidity of the wire for restraining the yawing motion of the movable body is improved.

In the second to the sixth embodiments as well as the first embodiment, when the wire is put on the direction-changing mechanism, it may be wound around the pulley one or more number of turns before its leading direction is changed.

As described above, a feeding apparatus of the present invention has a movable body elongated in the direction at a right angle to the moving direction thereof, at least one pair of linear guide devices, arranged in parallel, for guiding the movable body in the moving direction thereof, a linear drive device for moving the movable body along the linear guide device, and an attitude stabilizing device for stabilizing an attitude of the movable body by restraining a yawing motion of the movable body caused during the movement of the movable body. The movable body, the linear guide device, the linear drive device, and the attitude stabilizing device are all mounted on a base. The attitude stabilizing device includes at least one rope member, at least two fastening points, for fixing the rope member, mounted at both end portions of the base or the movable body while being separated from each other in the longitudinal direction of the movable body, and at least two direction-changing devices provided on the base or the movable body while being separated from each other in the longitudinal direction of the movable body. The first rope member is fastened at the first end to the first fastening point located closer to the first end of the base or the movable body, the remaining part of the first rope member is led to and put on the direction-changing device where the rope member being led is changed in its leading direction, and led to the second fastening point located point-symmetrical with the first fastening point and fastened at the second end thereto. The second rope member is fastened at the first end to the second fastening point located closer to the second end of the base or the movable body, the remaining part of the second rope member is led to and put on the direction-changing device where the second rope member is changed in its leading direction that is opposite to the above-mentioned one, and led to the first fastening point located point-symmetrical with the second fastening point and fastened at the second end thereto, so that a tension of the rope member restrains a yawing motion of the movable body. With such a construction, the feeding apparatus of the invention can restrain a yawing motion of the movable body with a simple construction. Accordingly, the feeding apparatus is able to reliably feed the movable body in a stable attitude. The feeding apparatus that is simple in structure and low in cost is realized.

What is claimed is:

1. A feeding apparatus comprising:
   a base;
   a movable body elongated in a longitudinal direction orthogonal to a moving direction of the movable body relative to the base;
   a linear guide device arranged on the base for guiding the movable body in the moving direction;
   a drive device for moving the movable body along the linear guide device; and
   an attitude stabilizing device for restraining a yawing motion of the movable body, the attitude stabilizing device comprising at least one transmission member, first and second fastening points formed in the movable body for fixing the transmission member, the first and second fastening points being separated from each other, and first and second direction-changing devices mounted on the base and separated from each other, each of the first and second direction-changing devices turning the transmission member around to be fastened at the first and second fastening points, respectively.

2. The feeding apparatus of claim 1, wherein the first direction-changing device extends the transmission member, which is fastened at the first fastening point, to a first direction, and
   the second direction-changing device extends the transmission member, which is drawn from the first direction-changing device, to a second direction in which the transmission member is fastened at the second fastening point.

3. The feeding apparatus of claim 2, wherein the attitude stabilizing device comprises third and fourth direction-changing devices mounted on the movable body and separated from each other in the longitudinal direction, the third direction-changing device extending the transmission member, which is drawn from the first direction-changing device, to a third direction, the fourth direction-changing device extending the transmission member, which is drawn from the third direction-changing device, to a fourth direction in which the transmission member extends to the second direction-changing device.

4. The feeding apparatus of claim 2, wherein the attitude stabilizing device comprises a third direction-changing device mounted on the base, located an the same side as the second direction-changing device with respect to the movable body in the moving direction, and separated from the second direction-changing device in the longitudinal direction, the third direction-changing device extending the transmission member, which is drawn from the first direction-changing device, to a third direction in which the transmission member extends to the second direction-changing device.

5. The feeding apparatus of claim 1, wherein the first and second fastening points are formed near both ends of the movable body in the longitudinal direction.

6. The feeding apparatus of claim 1, wherein the attitude stabilizing device comprises a tension adjusting mechanism for adjusting a tension of the transmission member.

7. A feeding apparatus comprising:
   a base;
   a movable body elongated in a longitudinal direction orthogonal to a moving direction of the movable body relative to the base;
   a linear guide device arranged on the base for guiding the movable body in the moving direction;
   a drive device for moving the movable body along the linear guide device; and
   an attitude stabilizing device for restraining a yawing motion of the movable body, the attitude stabilizing device comprising at least one transmission member, a first and second fastening points located on the base for fixing the transmission member, the first and second fastening points being separated from each other, and first and second direction-changing devices mounted on the movable body and separated from each other, each of the first and second direction-changing devices turning the transmission member around to be fastened at the first and second fastening points, respectively.

8. The feeding apparatus of claim 7, wherein the first direction-changing device extends the transmission member, which is fastened at the first fastening point, to a first direction, and
   the second direction-changing device extends the transmission member, which is drawn from the first direction-changing device, to a second direction in which the transmission member is fastened at the second fastening point.

9. The feeding apparatus of claim 7, wherein said linear guide device comprises a pair of linear guide members which are in parallel with each other, each of the linear guide members comprising a guide rail extending in the moving direction, the transmission member being drawn along the rail from the first fastening point to the first direction-changing device, and the transmission member being drawn along the rail from the second direction-changing device to the second fastening point.

10. The feeding apparatus of claim 7, wherein the attitude stabilizing device comprises a tension adjusting mechanism for adjusting a tension of the transmission member.

11. The feeding apparatus of claim 1, wherein the movable body comprises: a first movable body movable in an X-axis direction and elongated in a Y-axis direction orthogonal to the X-axis direction; and a second movable body movable in the Y-axis direction and elongated in the X-axis direction, wherein the linear guide device comprises: a pair of first linear guide members arranged on the base in parallel with each other, for guiding the first movable body in the X-axis direction; and a pair of second linear guide members arranged on the base in parallel with each other, for guiding the second movable body in the Y-axis direction, wherein the drive device comprises: a first drive device mounted on the base for moving the first movable body along the first guide member; a second drive device mounted on the base for moving the second movable body along the second linear guide member; and a coupling member coupling the first movable body and the second movable body, and wherein the attitude stabilizing device comprises: the first and second fastening points formed in the second movable body for fixing the transmission member, the first and second fastening points being separated from each other with respect to the second movable body in the X-axis direction; and the first and second direction-changing devices mounted on the base and separated from each other with respect to the second movable body in the Y-axis direction.

12. The feeding apparatus of claim 11, wherein the attitude stabilizing device comprises a third direction-changing device mounted on the base, located on the same side as the second direction-changing device with respect to the second movable body in the Y-axis direction, and separated from the second direction-changing device in the X-axis direction, the first direction-changing device extending the transmission member, which is fastened at the first fastening point, to the third director-changing device, the second direction-changing device extending the transmission member, which is drawn from the third direction-changing device, to the second fastening point, and the third direction-changing device extending the transmission member, which is drawn from the first direction-changing device, to the second direction-changing device.

13. The feeding apparatus of claim 11, wherein the attitude stabilizing device comprises: a second transmission member; third and fourth fastening points mounted on the base for fixing the second transmission member, the third and fourth fastening points being separated from each other with respect to the first movable body in the Y-axis direction; and fourth and fifth direction-changing devices mounted on the first movable body and separated from each other in the Y-axis direction, each of the fourth and fifth direction-changing devices turning the second transmission member around to be fastened at the third and fourth fastening points, respectively.

14. The feeding apparatus of claim 13, wherein the fourth direction-changing device extends the second transmission member, which is fastened at the third fastening point, to the fifth direction-changing device, and the fifth direction-changing device extends the second transmission member, which is drawn from the fourth direction-changing device, to the fourth fastening point.

15. The feeding apparatus of claim 7, wherein the movable body comprises: a first movable body movable in an X-axis direction and elongated in a Y-axis direction orthogonal to the X-axis direction; and a second movable body movable in the Y-axis direction and elongated in the X-axis direction, wherein the linear guide device comprises: a pair of first linear guide devices arranged on the base in parallel with each other, for guiding the first movable body in the X-axis direction; and a pair of second linear guide devices arranged on the base in parallel with each other, for guiding the second movable body in the Y-axis direction, wherein the direction device comprises: a first drive device for moving the first movable body along the first linear guide device; a second drive device for moving the second movable body along the second linear guide device; and a coupling member coupling the first movable body and the second movable body, and wherein the attitude stabilizing device comprises: the first and second fastening points mounted on the base for fixing the transmission member, the first and second fastening points being separated from each other with respect to the first movable body in the Y-axis direction; the first and second direction-changing devices mounted on the first movable body and separated from each other in the Y-axis direction.

16. The feeding apparatus of claim 15, wherein the first direction-changing device extending the transmission member, which is fastened at the first fastening point, to the second direction-changing device, and the second direction-changing device extending the rope member, which is drawn from the first direction-changing device, to the second fastening point.

17. The feeding apparatus of claim 15, wherein the attitude stabilizing device comprises: a second transmission member; third and fourth fastening points formed in the second movable body for fixing the second transmission member, the third and fourth fastening points being separated from each other with respect to the second movable body in the X-axis direction; and third and fourth direction-changing devices mounted on the base and separated from each other with respect to the second movable body in the Y-axis direction, each of the third and fourth direction-changing devices turning the second transmission member to be fastened at the third and fourth fastening points, respectively.

18. The feeding apparatus of claim 17, wherein the attitude stabilizing device comprises a fifth direction-changing device mounted on the base, located on the same side as the fourth direction-changing device with respect to the second movable body in the Y-axis direction, and separated from the fourth direction-changing device in the X-axis direction, the third direction-changing device extending the second transmission member, which is fastened at the third fastening point, to the fifth direction-changing device, the fourth direction-changing device extending the second transmission member, which is drawn from the fifth direction-changing device, to the fourth fastening point, and the fifth direction-changing device extending the second transmission member, which is drawn from the third direction-changing device, to the fourth direction-changing device.

* * * * *